(12) United States Patent
Li et al.

(10) Patent No.: US 11,386,898 B2
(45) Date of Patent: Jul. 12, 2022

(54) SYSTEMS AND METHODS FOR PERFORMING TASK USING SIMPLE CODE

(71) Applicants: Chian Chiu Li, Fremont, CA (US); Xin Li, Toronto (CA)

(72) Inventors: Chian Chiu Li, Fremont, CA (US); Xin Li, Toronto (CA)

( * ) Notice: Subject to any disclaimer, the term of this patent is extended or adjusted under 35 U.S.C. 154(b) by 0 days.

(21) Appl. No.: 17/067,681

(22) Filed: Oct. 10, 2020

(65) Prior Publication Data

US 2021/0027781 A1 Jan. 28, 2021

Related U.S. Application Data

(63) Continuation-in-part of application No. 16/423,038, filed on May 27, 2019, now Pat. No. 10,867,606.

(51) Int. Cl.
*G10L 15/22* (2006.01)
*G06F 3/01* (2006.01)

(52) U.S. Cl.
CPC .............. *G10L 15/22* (2013.01); *G06F 3/013* (2013.01)

(58) Field of Classification Search
CPC .................................. G10L 15/22; G06F 3/013
See application file for complete search history.

(56) References Cited

U.S. PATENT DOCUMENTS

| | | | |
|---|---|---|---|
| 6,501,832 B1 | 12/2002 | Saylor et al. | |
| 9,423,870 B2 * | 8/2016 | Teller | G06F 3/013 |
| 9,672,370 B1 | 6/2017 | Lewis et al. | |
| 2002/0194270 A1 | 12/2002 | Gagnon | |
| 2005/0086056 A1 | 4/2005 | Yoda et al. | |
| 2005/0132003 A1 | 6/2005 | Philyaw | |
| 2006/0136222 A1 | 6/2006 | Cross et al. | |
| 2007/0024579 A1 | 2/2007 | Rosenberg | |
| 2007/0162412 A1 | 7/2007 | Percy | |
| 2007/0233662 A1 | 10/2007 | Bashardoost et al. | |
| 2008/0301585 A1 | 12/2008 | Murray et al. | |
| 2010/0161658 A1 | 6/2010 | Hamynen et al. | |
| 2011/0066423 A1 | 3/2011 | Erhart et al. | |
| 2011/0137730 A1 | 6/2011 | McCarney et al. | |
| 2011/0209201 A1 | 8/2011 | Chollat | |
| 2012/0001938 A1 | 1/2012 | Sandberg | |
| 2012/0072285 A1 | 3/2012 | Marhoefer | |
| 2013/0132488 A1 | 5/2013 | Bosworth et al. | |
| 2013/0256402 A1 | 10/2013 | Lim et al. | |
| 2014/0181256 A1 | 6/2014 | Trifa et al. | |
| 2014/0267011 A1 | 9/2014 | Devries | |
| 2014/0267034 A1 | 9/2014 | Krulce et al. | |
| 2014/0337740 A1 | 11/2014 | Kwon et al. | |
| 2014/0344062 A1 | 11/2014 | Lamont | |
| 2014/0350942 A1 | 11/2014 | Kady et al. | |
| 2015/0002483 A1 | 1/2015 | Case et al. | |
| 2015/0130716 A1 | 5/2015 | Sridharan et al. | |
| 2016/0070344 A1 | 3/2016 | Gohl | |
| 2016/0209907 A1 | 7/2016 | Han et al. | |
| 2016/0217794 A1 | 7/2016 | Imoto et al. | |
| 2017/0351367 A1 | 12/2017 | Popovich et al. | |

* cited by examiner

Primary Examiner — Laura A Gudorf (57) ABSTRACT

Systems and methods for performing a task via a simple code. Combination of a unique marker and a simple code represents a task. A simple code is submitted manually or by a voice input. Voice recognition and gesture recognition are used. In an aspect, a task is executed when a voice input comprises a predetermined name and a simple code. In another aspect, a task is executed when a voice input comprises a simple code and a user gazes or gestures at a device.

20 Claims, 7 Drawing Sheets

Table 1. Code Examples

| Code Type | Code Example |
|---|---|
| 1-Digit | 1 |
| 2-Digit | 12 |
| 3-Digit | 123 |

Step 1: User wants more info of object A.

Step 2: User runs program.
         Marker info is obtained.

Step 3: User keys in the code.
         Device is directed to
         a website.

Step 4: A webpage is open
         on device.

Step 1. User starts app by saying "Start code app"  ((( "Start code app"

Step 2. User says "777"  ((( "777"

Step 3. Device generates audio output  ))) "Cap Store, say 1 to call, say 2 for audio info"

Step 4. User selects option by saying "1"  ((( "1"

Step 5. Device makes phone call  ))) Calling Cap Store

SYSTEMS AND METHODS FOR PERFORMING TASK USING SIMPLE CODE

CROSS REFERENCE TO RELATED APPLICATION

This is a continuation-in-part of U.S. patent application Ser. No. 16/423,038, filed May 27, 2019, which is a continuation-in-part of U.S. patent application Ser. No. 14/961,901, filed Dec. 8, 2015. This application is related to U.S. patent application Ser. No. 15/723,082, filed Oct. 2, 2017, Ser. No. 15/917,625, filed Mar. 10, 2018, Ser. No. 15/936,418, filed Mar. 26, 2018, and Ser. No. 16/401,094, filed May 1, 2019.

BACKGROUND

Field of Invention

This invention relates to executing a task, more particularly to executing a task via submitting a simple code at a device.

Description of Prior Art

As more and more information is provided or published on the Internet, easy access of online info becomes increasingly desirable. So far going directly to a website via a browser is the most used method to retrieve information online. For instance, if info is needed for a product of a store, we may visit the store's website looking for a relevant page. Accessing a website requires the knowledge of website address, or uniform resource locator (URL). A user may enter a URL manually or search for the website using key words. But for most people, keying in a URL's long string of letters and signs on a device, especially on a smartphone with a small virtual keyboard, is inconvenient and frustrating. Opening a search page, keying in a key word, and starting a search process may cause several steps and may be frustrating as well. In fact, people tend to avoid keying in words, especially unfamiliar words or a string whenever possible. Another access method involves code scanning using, for instance, a phone camera and certain application. For example, there are products and printed materials which carry a quick response (QR) code. QR code is a two-dimensional barcode which may contain URL and other information. After a QR code is scanned by a smart phone, with an appropriate app, the phone may be directed to a website determined by the QR code. Then the phone may download data from there, and display a webpage. In the process, scanning causes the phone to display certain content automatically and there is no need for a user to enter anything. However, although a QR code brings some convenience, scanning a code itself is still awkward and demanding. For instance, a user may have to hold a smartphone firmly, aim at a code precisely, and then wait for a qualified scan to take place. The scan process requires time, some skill, and patience, which is not well accepted by some users.

Therefore, there exists a need for easy, quick, and convenient access of online information.

At times, people make phone calls to reach a business or organization for information or participation of certain program. A phone number may come from a TV commercial, radio advertisement, magazine ad, or newspaper ad. The number, new and unknown, has to be remembered temporarily and most likely would be used only once. For most people, memorizing a phone number is not an easy job. It is both intimidating and challenging, in particular when a number is briefly shown on a television screen or announced on the air only once or twice. As a consequence, calling a business, which may be promoted in advertisements costly, is actually hindered by the advertised info, i.e., the long phone number. In addition, keying in a long phone number is also boring and demanding.

Therefore, there exists a need for easy, quick, and convenient ways to call an unfamiliar number.

Since both accessing online information and making a phone call are executable tasks for certain electronic devices, such as smartphones, aforementioned needs may be summarized as a need for performing a task easily and conveniently.

OBJECTS AND ADVANTAGES

Accordingly, several main objects and advantages of the present invention are:

a). to provide improved methods and systems to do a task, such as accessing online information or making a phone call;

b). to provide such methods and systems which combine a distinctive marker with a simple code to represent a task exclusively;

c). to provide such methods and systems which use the info of location, time, object, entity, image, or any combination thereof as a distinctive marker;

d). to provide such methods and systems which enable a user to do a task via a simple code;

e). to provide such methods and systems which enable a user to do a task by uttering a predetermined name (e.g., a device name or program name) and a simple code;

f). to provide such methods and systems which enable a user to do a task by uttering a simple code plus a gazing or gesturing act; and g). to provide such methods and systems which make performing a task easy, quick, and convenient.

Further objects and advantages will become apparent from a consideration of the drawings and ensuing description.

SUMMARY

In accordance with the present invention, methods and systems are proposed for performing a task using a simple code. A simple code may be submitted by manual or verbal methods. A simple code may be combined with a distinctive marker to represent a task. Marker info may include a location of a device, time, object, entity, image, or any combination thereof. Marker info may be obtained automatically. After a code and a marker are transmitted from a device to a service facility, a corresponding task is retrieved and then sent to the device for implementation. To do a task, a user may utter a predetermined name (e.g., a device name or program name) and a simple code. A user may also utter a simple code with a gaze act or gestures. Consequently, many tasks, such as accessing online info, calling a number, or running other programs, may become easy and convenient to start out.

DRAWING FIGURES

FIGS. 9-A, 9-B, 10, 11, and 12 show exemplary diagrams illustrating embodiments of issuing a verbal command in accordance with the present invention.

REFERENCE NUMERALS IN DRAWINGS

| 10 | Sensor | 12 | Device |
|---|---|---|---|
| 14 | Processor | 16 | Computer Readable Medium |
| 18 | Sensor | 20 | Sensor |
| 22 | Poster | 24 | Smartphone |
| 26 | Device | 28 | User |
| 30 | Device | 32 | Device |
| 34 | Sensor | | |

100, 102, 104, 106, 108, 110, 112, 114, 116, 118, 120, 122, 124, 126, 128, 130, 132, 134, 135, 136, 137, 138, 140, 142, 144, 146, 148, 150, 152, 154, 156, 158, and 160 are exemplary steps.

DETAILED DESCRIPTION

The following exemplary embodiments are provided for complete disclosure of the present invention and to fully inform the scope of the present invention to those skilled in the art, and the present invention is not limited to the schematic embodiments disclosed, but can be implemented in various types.

Figure 1:
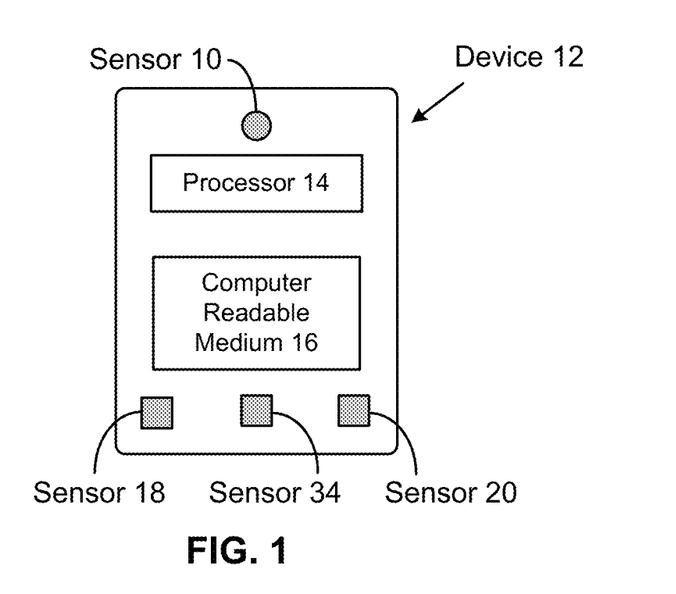
FIG. 1 is an exemplary block diagram describing one embodiment in accordance with the present invention.

FIG. 1 is an illustrative block diagram of one embodiment according to the present invention. A device 12 may represent an electronic device, including but not limited to a smart phone, a smart watch, a wearable device, a handheld computer, a tablet computer, a virtual reality (VR) device, an augmented reality (AR) device, and the like. Device 12 may include a processor 14 and computer readable medium 16. Processor 14 may mean one or more processor chips or systems. Medium 16 may include a memory hierarchy built by one or more memory chips or storage modules like RAM, ROM, FLASH, magnetic, optical and/or thermal storage devices. Processor 14 may run programs or sets of executable instructions stored in medium 16 for performing various functions and tasks, e.g., surfing on the Internet, placing a phone call, placing an online purchase order, playing video or music, gaming, electronic payment, social networking, sending and receiving emails, short messages, files, and data, launching or executing a program or app, etc. Device 12 may also include input, output, and communication components, which may be individual modules or integrated with processor 14. The communication components may connect the device to another device or a communication network. Usually, Device 12 may have a display (not shown) and a graphical user interface (GUI). A display may have liquid crystal display (LCD) screen, organic light emitting diode (OLED) screen (including active matrix OLED (AMOLED) screen), or LED screen. A screen surface may be sensitive to touches, i.e., sensitive to haptic and/or tactile contact with a user, especially in the case of smartphone, tablet computer, smart watch, and some wearable devices. A touch screen may be used as a convenient tool for a user to enter an input and interact with a system. Furthermore, device 12 may also have a voice recognition component or mechanism for receiving verbal commands or audio inputs from a user. For VR or AR devices, it is impractical to touch a real screen. In such cases, a virtual screen, verbal command, or gesture instructions may be useful for users.

A communication network which device 12 may be connected to may cover a range of entities such as the Internet or the World Wide Web, a local area network (LAN), a wide area network (WAN), a metropolitan area network (MAN), a telephone network, an intranet, wireless, and other types of networks. Device 12 may be connected to a network by various wired, wireless, optical, infrared, ultrasonic or other communication methods. Via a network, device 12 may communicate with a remote facility or service center, send data, receive data, or engage interactive acts.

Device 12 may include a sensor 10 which may be a camera, such as a rear-facing camera of a smartphone. The camera may be arranged to take pictures as well as scan QR codes, one-dimensional barcodes, and other machine-readable codes with the help of certain application.

Device 12 may also include a sensor 18 which is a near-field communication (NFC) device. NFC is of short-range wireless communication technology and may be employed to read radio-frequency identification (RFID). RFID is a wireless technology for the purpose of transferring identification data passively or actively. A RFID tag may be made very small in size, e.g., smaller or much smaller than one millimeter. It may be placed, for instance, at a designated convenient place at a store, or embedded in a product, e.g., in a magazine. Assume that a store RFID tag contains info about the store. If the store RFID tag is read or accessed by a user's device, it means that the user is at the store and a store marker may take effect immediately. If a RFID tag embedded in magazine is accessed, it may mean a magazine marker is taken and the marker may remain active for a given period of time.

Device 12 may also include a sensor 34 which tracks the eye movement or gazing direction of a user using mature eye-tracking or gaze detection technologies. The sensor may be arranged on the top surface of the device, or close to a display screen, and may be designed to have imaging capability. With imaging functions, a system may recognize whether an eye is in such a state that the eye sight falls on the body of device 12 using certain algorithm, in other words, sensor 34 may be employed to determine whether a user is looking at the body or the screen of a device. Once it senses that a user is gazing or looking at a given target, it may record the starting time, and then the total gazing or watching time. Only when the gazing or watching time exceeds certain value, for instance a few seconds, it may be determined that a user is gazing or looking at a target. As a consequence, a very brief look may be too short to qualify as a gazing or watching act. In following descriptions, it is assumed the total gazing time of each case satisfies a minimum value requirement when it is said a gazing act is detected.

Like sensor 10, sensor 34 may be built using mature imaging technologies, such as camera technologies which are used in almost every smartphone. An image of a user's eye may be analyzed with mature algorithm to decide which direction the user is looking at. Both visible and infrared light may be employed for eye tracking. In the latter case, an infrared light source may be arranged to provide a probing beam. In addition, sensor 34 may also employ other suitable technologies which are capable and affordable other than the eye-analysis scheme described to determine a gazing or watching direction of a user. In some applications, when the accuracy of gazing direction is not critical, such as when a gaze target is a screen, not a small area of the screen, a watching direction may be obtained via analyzing facial pictures of a user.

Furthermore, device 12 may carry a positioning sensor 20. Sensor 20 may be a global positioning system (GPS), which enables a device to get its own location info. Device position may also be obtained using wireless triangulation methods, or via a system using other suitable technologies, which may be arranged by a service provider or service facility. Usually for indoor or some urban environment, positioning methods other than GPS are used, since GPS requires a clear view of the sky or clear line of sight for four GPS satellites.

Inside device 12, output signals of sensors may be transmitted to processor 14, which, employed with certain algorithm, may process the data and send messages to specific applications responsible for working with the sensors. The applications may process the messages and proceed accordingly, such as transferring certain information to service center, waiting for instructions or tasks from the center, and then implementing instructions or carrying out a task.

Figure 2:
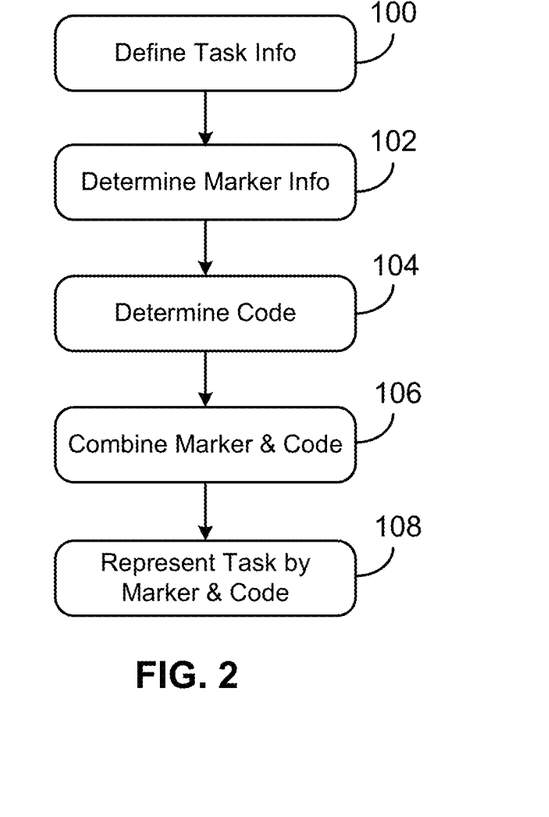
FIG. 2 is an exemplary flow diagram showing one embodiment of task representation in accordance with the present invention.

FIG. 2 is a schematic flow diagram showing one embodiment of representing a task by a marker and a code. Usually a task is a task, and doing a task means executing a program or application which is designed for implementing it. Take smartphone for example. A user may go to a particular page, find a corresponding app, and launch the app. If the app is a browser, a user may enter a website address, and then tap an enter button. The whole process may be boring and frustrating. FIG. 2 introduces an embodiment which uses a marker and a code to represent a task for public use. With such an arrangement, a task may be accessed and performed easily and conveniently. For instance, a marker may be obtained automatically. A user may only need to enter a simple code. A task may be performed after a code and marker are received. To represent various tasks, each marker is designed unique. When a unique marker is bundled with a code, even a simple code, the combination becomes unique as well. Thus, a simple code plus a marker may represent a task exclusively. A marker may be selected such that it may be acquired automatically via a user device such as a smartphone or a service provider. A code may be simple and easy to remember. A code may be of a number, a letter, a sign, a character, a word, an icon, or any combination of them. It's obvious that a very simple code has a single-digit number, single letter, or single sign. A marker may be anything which represents a distinctive feature related to a target object or task. A marker may be shared by a number of objects or tasks. Examples of marker may include a location of device, a time period, an object, an entity, an image shown on a VR or AR device, or a combination of different features like location plus time, or entity plus time. Location and time data may be collected automatically by a user device, a service provider, or an on-site sensing facility. Object and entity data may be obtained via an RFID or code-scanning method. RFID info may be gathered by placing a reader device close to an RFID tag, with minimum effort. But since QR codes and bar codes require specific manual work, they are useful but not as convenient to use as other methods.

Back to FIG. 2. At step 100, a task which needs representation is defined. Next at step 102, a distinctive marker is determined. The marker may fit the application of the task and may be conveniently acquired when needed. At step 104, a code is selected or determined. A code may nominally stand for a task of interest. A code may be short, simple, and unique, though the uniqueness only applies to codes under one marker. At step 106, the marker and code are combined. The combination may be assigned to represent the task at step 108. For instance, a store location is unique and may be used as a marker. If three digits are used for code, there are one thousand distinctive codes and thus one thousand combinations of marker and code, where each combination is unique. If marker plus code are used to represent products at the store, one thousand products may be covered. In some embodiments, when a code is entered at a user device by a user at the store, the code is automatically bundled with the store location marker. The code and marker info may be sent to service center, which may find out which task is represented by the two elements. Then, a corresponding task may be obtained and sent to the user device. The task may be of accessing a web page and presenting information about a product which is associated with the code. When a marker is acquired automatically, a user only needs to enter a simple code, which may create an easy and convenient process. As a user needs to enter a code, the code information may be displayed publicly, while the marker info may not. Among the task, marker, and code information, only the task and code information needs to be presented publicly for public use most times.

Figure 3:
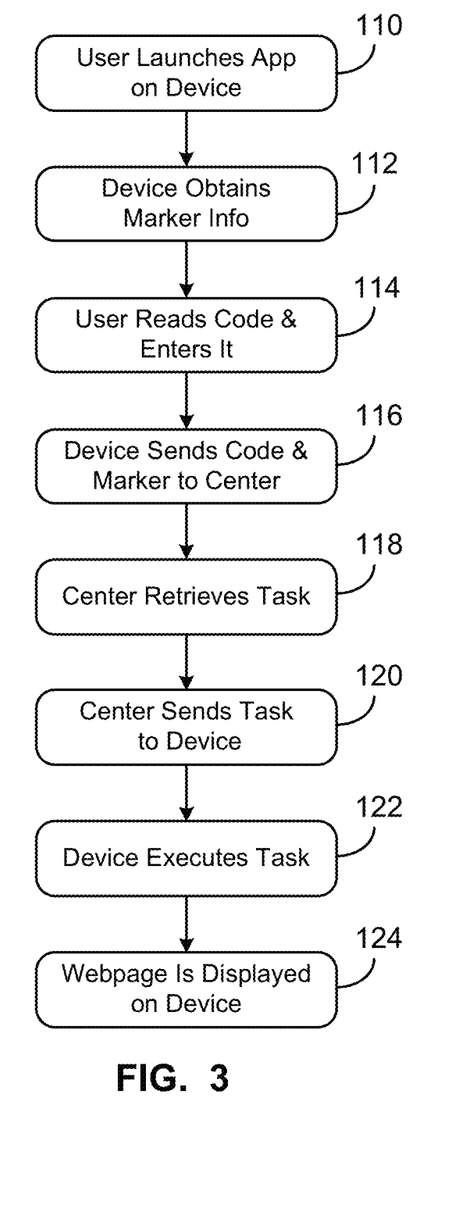
FIG. 3 is an exemplary flow diagram showing one embodiment of accessing online information in accordance with the present invention.

FIG. 3 is a schematic flow diagram showing one embodiment of executing a task, or obtaining online information using a simple code. At step 110, a user opens an app to start a process at a device. Normally, logging on a website on the Internet means launching a browser and entering a URL or website address. The task may be simplified by entering an easy code like "123" or even a single-digit number like "1". At step 112, marker info is obtained, which may be completed automatically by the device via the app or a service provider via a program. For instance, if the device contains GPS, location data may be collected automatically. Location data and time data may work as the marker info. At step 114, the user may find a code and enters it at the device. The code and task info may be on display to let users know the nature of a task and how to do it. Since location and time data is not handled by user, there is no need to display it. For instance, a sentence like "Please tap 123 to log on our website" may be displayed. Here "log on our website" is the task, and "123" is the code. At step 116, the marker and code info may be sent to service center to locate a predetermined task. Next at step 118, the center may use the marker and code to find a task at a database. The task may include instructions which contain information to log on the website. Then the center may transmit the task to the device at step 120, and the device may start the task at step 122. Finally at step 124, the task is performed, and the device may log on the web site. After certain data is downloaded, the device may display a web page with information which the user is looking for.

The scheme illustrated in FIG. 3 provides an easy, quick, and convenient way to execute a task, as a user only needs to key in a simple code. Tasks may be prearranged to cover a wide range of assignment, including, for example, placing a phone call, starting a specific program or app, communicating with another device, sending a command to another device, etc. Thus, with a simple code such as "123" and automatically obtained marker info, various tasks may be pursued and accomplished. In descriptions below, more embodiments will be presented.

Figure 4:
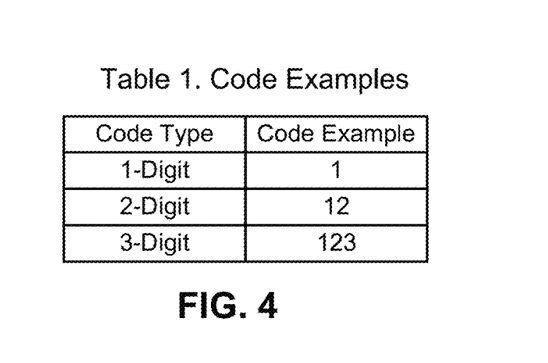
FIG. 4 is a table showing examples of simple codes in accordance with the present invention.

FIG. 4 shows a table illustrating three types of simple code exemplarily, including one-digit, two-digit, and three-digit numbers. One-digit code is of the simplest type. A single-digit code may be used in multiple places simultaneously, and may still be unique when combined with a distinctive marker at each place. As a code may also include a letter, a character, an icon, or a sign, any single item of them may be used as code too. A code with three digits or less may be especially desirable for television and radio commercials due to the ease of handling, and its advantage is obvious compared to a ten-digit phone number. When a code contains a letter, a character, an icon, or a sign, a touch screen may display them respectively. When voice recognition is available, a code may be submitted verbally by a user. For instance, after a code app is on, a user may utter a code to a device to submit it.

Figure 5:
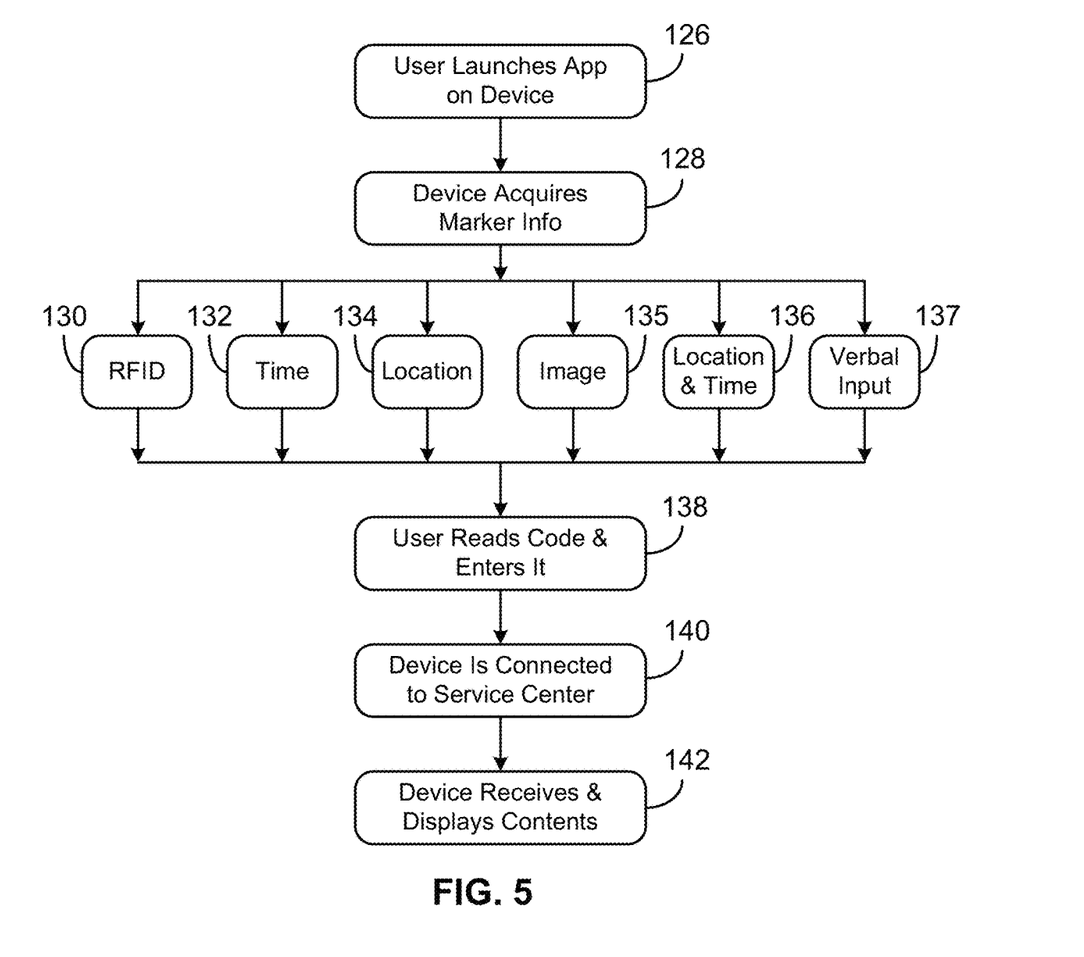
FIG. 5 is an exemplary flow diagram showing embodiments with different markers in accordance with the present invention.

FIG. 5 shows a schematic flow diagram of accessing online information with emphasis on markers and methods to get markers. A distinctive marker, combined with a simple code, may be used to represent a task exclusively. For instance, two tasks may be represented respectively by two markers with the same code, or two codes under the same marker. As there is a limited quantity of simple and easy-to-remember codes, arranging unique markers is important. Furthermore, marker information is better obtained automatically so that a user may only need to enter a simple code, which may make the process of performing a task easy and convenient. When a marker is not acquired automatically, verbal input may be used as a convenient alternative, as saying is much easier than keying in. If marker info is automatically taken, only task and code info needs to be displayed publicly. A user may read the info to learn the task and get the code.

One choice of marker is location. Location data is unique by itself, and location info may be obtained automatically by GPS or other methods. A location may be a business periphery, a place of an organization, an event site, a user's home, a public venue, etc. A location marker may also be arranged to cover a region, such as a town, a city, a state, or a country.

Another choice of marker is time. Time is also unique and thus may be used to define an applicable range. Time data is also easy to get, as most devices have an internal electronic clock. A time-dependent marker may contain a start and ending point to specify a time period. When location and time info are combined, they may form another kind of marker defined by a place and a time period together. For instance, at a store, a code may represent one product at one time, and the same code may represent another product at another time. Here the marker has both location and time factors.

In addition, a RFID tag may be designed to contain marker info which may be associated to all kinds of objects or entities, such as a product, an organization, or anything. A device may get RFID data via an NFC sensor and take marker info from it. After that, when a code is entered by a user within a given time period, the code and marker info may be combined. The bundled info may be transmitted to service center. The center may locate a task based on marker and code data and proceed as instructed by the task.

For VR and AR devices, images and programs are presented to users individually. Each image or program may be used as a marker. For instance, assume a VR device is connected to the Internet. The device shows an image that contains an object with a code displayed. In some embodiments, when a user submits the code at the VR or AR device within certain time after presentation of the image, the code and the image marker may be sent to service center. Then a task may be retrieved and transmitted to the device. Following instructions of the task, the device may, for example, log on a web page which may contain info on the object. It is noticed that VR and AR devices may use afore-mentioned markers such as location marker and time marker or markers used by other devices as well.

Returning to FIG. 5. First, a user starts an app at step 126. Next at step 128, marker info is obtained. As discussed, there are several ways to gather marker info. At step 130, RFID method is used. RFID data may be collected by an NFC sensor like sensor 18 of FIG. 1. Once RFID info is obtained, its marker content is retrieved by the app. The marker may remain valid in a certain time period or until another marker is invoked. Thus, a marker from RFID is actually valid only during a limited time period. Besides, a RFID tag may be designed to work in a predetermined time slot, so that only code entered in certain time period may be combined with the marker info to invoke a pre-arranged action. Optionally, a RFID tag may be used to label a magazine, a book, or an object which circulates with a broad and fuzzy location and time range. Codes may be provided in a magazine, book, or on an object for further information on the Internet. A user may access a RFID tag, and then enter a code to reach an online source easily and conveniently.

At step 132, time is enlisted as the marker. Time info is readily available for many devices. So any code entered by a user may be associated with a time marker. A specific time plus a code may form a distinctive label which may prompt a device to initiate a pre-scheduled program. As a time marker may cover many places, a code arranged with it shall be selected carefully so as not to point to multiple tasks at the same time. A time marker is useful for situations where time is an important indicator, while location plays a minor role. For instance, a time marker may be used in a radio advertisement. No matter where a listener is located, after an app is launched on a smartphone, a user may enter a simple code to access a specific web page, or dial a specific phone number. Thus instead of entering a complicated web address or a long phone number, a listener may just need to key in a couple of digits.

Step 134 introduces the location marker. Location info may be obtained by GPS like sensor 20 of FIG. 1. The info may also come from a service facility through a program. A location marker has a fairly clear geographical coverage. For example, a store location marker may be designed to work inside a store only. A code entered on a device may be combined with the marker to fetch product information or perform certain task arranged by the store. For instance, if a product has a code 11, keying in 11 on a smartphone may open a browser and display a webpage showing info about the product. Therefore location markers and simple codes may allow merchants to provide easy-to-get info and easy-to-do tasks for improved shopping experience.

Step 135 is designed for VR or AR devices which may show content items to users individually and exclusively. When a VR or AR device presents an image or video clip, the presentation itself may be used as a marker. For instance, when an image is displayed, a code may be assigned to an object in the image and presented. After a user sees and then enters the code, the device may send it along with an image ID to service center. Thus a task may be retrieved and sent back to the device. The device may also be arranged to transmit code and time data to service center. The center may find image info based on the time from a service provider, and then retrieve certain prearranged task accordingly.

In some cases, a code may be designated to point to an object for a long time. But a code used in some other cases may represent a thing for a short time period. For instance, a code for an ad printed on newspaper may be arranged valid for a few days or a week only, as a copy of newspaper may be forgotten after a day or two. Thus for certain applications, a marker may have two limiting factors: Location and time, which is reflected at step 136. First, the app acquires location and time data as marker info. Once a user enters a code, the marker and code may be combined together to point to a task which matches the three conditions. A location & time marker is also useful for airport, school, and convention site, where things change over time frequently. Changing with time makes the main difference between a location marker and location & time marker. In the former case, there may be no need to check time, while in the latter situation, both location and time data are required to seek a matching action item.

Step 137 illustrates another method to get marker info which utilizes verbal inputs of a user. Unlike others introduced, a marker from a verbal message is not automatically obtained, since a user has to say something. But it's still convenient, as with voice recognition technology, a user may easily and quickly utter one word or a short sentence to submit a marker and/or a code. For instance, a user may speak to a device "home" to set up a marker for home and then enter or say a code to carry out a task. A user may also say the name of a magazine. After a device receives the verbal message and identifies the magazine, a marker of magazine is obtained. Then codes entered at the device may be combined with the marker within a given period of time. Assume that simple codes are provided for online info on the magazine. A user may access the online info easily and conveniently by keying in or speaking a simple code. Verbal input may be applied to all devices equipped with voice recognition technologies, including VR and AR gadgets. Like markers prepared for RFID methods, markers arranged for verbal methods may include a wide range of objects and entities, such as location, product, organization, community, event, activity, or anything which is suitable for a marker role.

An app on a device may be designed to work with various markers. For instance, after it is turned on, an app may start gathering info. First, it may record the time. Then, location data may be obtained through a GPS sensor or from a service facility. For example, if a user is at an indoor mall, where GPS method is no longer used, he or she may rely on a Wi-Fi-based positioning system (WPS) provided by the facility to get location info. Next the app may await input of a code from the user. If a code is received, the app may send to service center the time, location, and code info. Then the center may start searching for a pre-determined task which matches the marker and code data at a database. Alternatively, the center may check whether there is a location marker for the location, a time marker, or a location & time marker, and then use a code to find a task.

While an app is awaiting user inputs, an NFC sensor may be turned on. If a RFID tag is detected and a marker obtained, the marker may have higher priority in case a location marker with the same code produces a different result.

At step 138, the user may find a code and enter it at the device. Next at step 140, the device may, for example, log on a website of service center. Data is sent to the center. The data contains the marker and code info, which causes the center to find a task accordingly. For instance, there may be a database storing information related to tasks, markers, and codes registered at the center. For every pair of marker and code, there exists an action item. A server at the center may retrieve one action item and proceed by taking instructions attached to the item. The instructions may include certain actions executable by the center, like sending a task to the device, or sending a message to another device which is away from the user and causing it to perform a task. At step 142, the device may act according to information received from the center. For instance, the information may cause the device to fetch information from a website, and then display it on a screen.

Since marker info may be taken through several methods or from several sources, it may be designed that a method used or source used is sent to service center as well. For instance, location info may be obtained through GPS method, RFID method, or verbal input, which corresponds to the marker origin, i.e., GPS, RFID tag, or user respectively. So it may be desirable to know how often a method is used to get location data. Sometimes, a device may obtain its location marker automatically and send the info to service center. After a while, a user may speak to the device to submit a different location. In such a case, the device may send new location info and method used to service center. The center may overwrite marker info obtained from a measurement and update it with user-provided info if the center determines the info is from a user. Thus it may be designed that marker info, which is sent from a device or facility to service center, includes content of a marker and a method used to get the content.

Similarly, as code info may come from a key-in process or voice input, a code sent to service center may be attached with a note identifying which method is used. Such info may be useful, as it is related to a user's habit and tendency.

Figure 6:
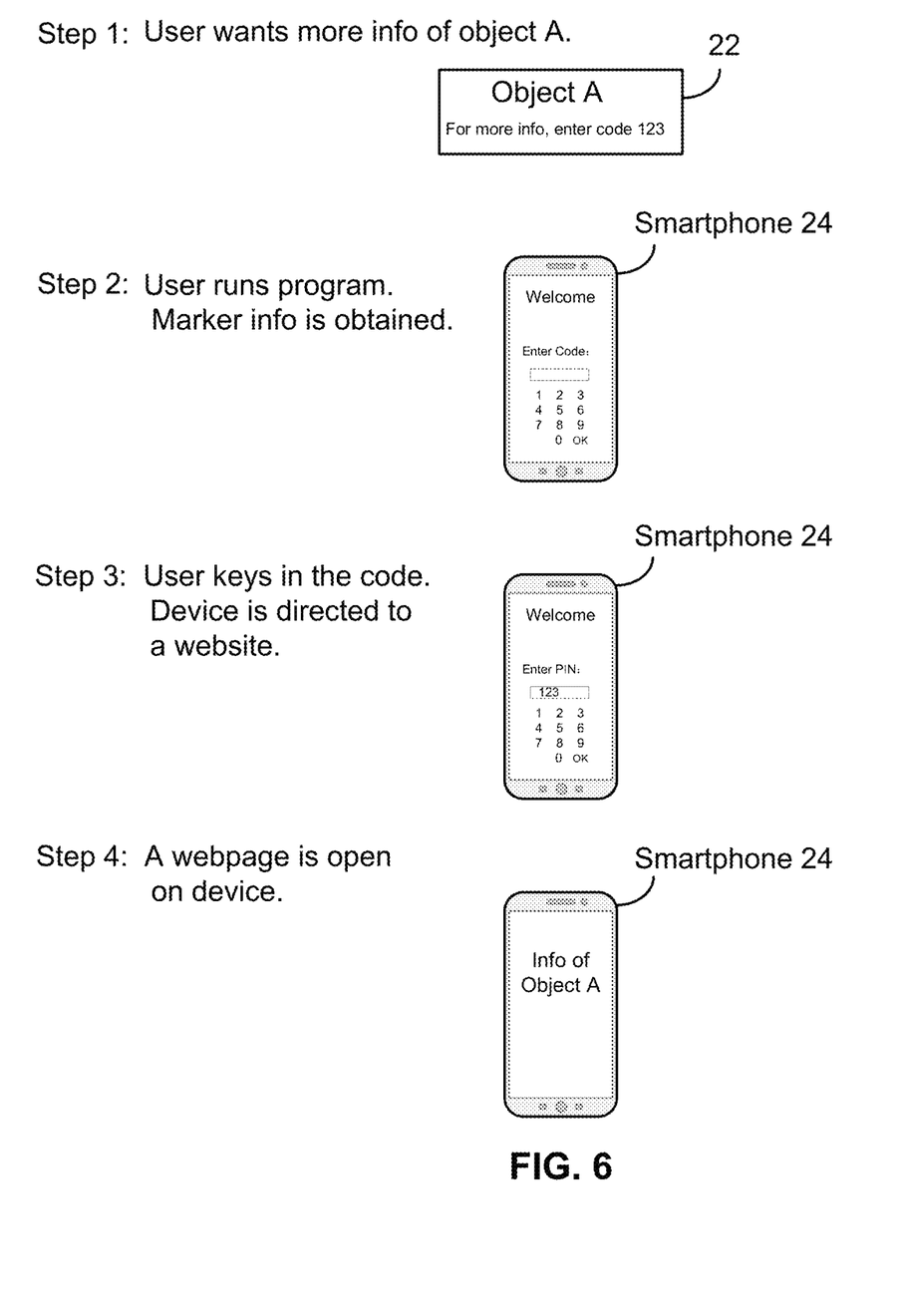
FIG. 6 uses exemplary diagrams to show one embodiment using simple code to access web info in accordance with the present invention.

FIG. 6 uses graphic diagrams to show another embodiment of getting online information via a simple code in an easy and convenient way. Assume a smartphone 24 is used in a retail, convention, or amusement park setting. It starts with step 1 when a user finds an object A and wants to know more information about it. The user notices that object A has a simple code 123 as displayed on a poster 22. The code is arranged for getting more information. At step 2, the user may start an app on phone 24. The app may retrieve time and location info automatically. As the user is on a periphery of a business, a distinctive location marker may be identified. Next at step 3, the user may enter code "123" at the phone. The app may cause phone 24 to send the marker, time, and code data to service center. After searching a database, the center may retrieve a corresponding action item and then send a message to phone 24. The message may instruct the app to open a web browser and visit a specific website which contains detailed information about object A. Then at step 4, the app may make the phone download data from the website and display a webpage which provides certain content related to object A.

Figure 7:
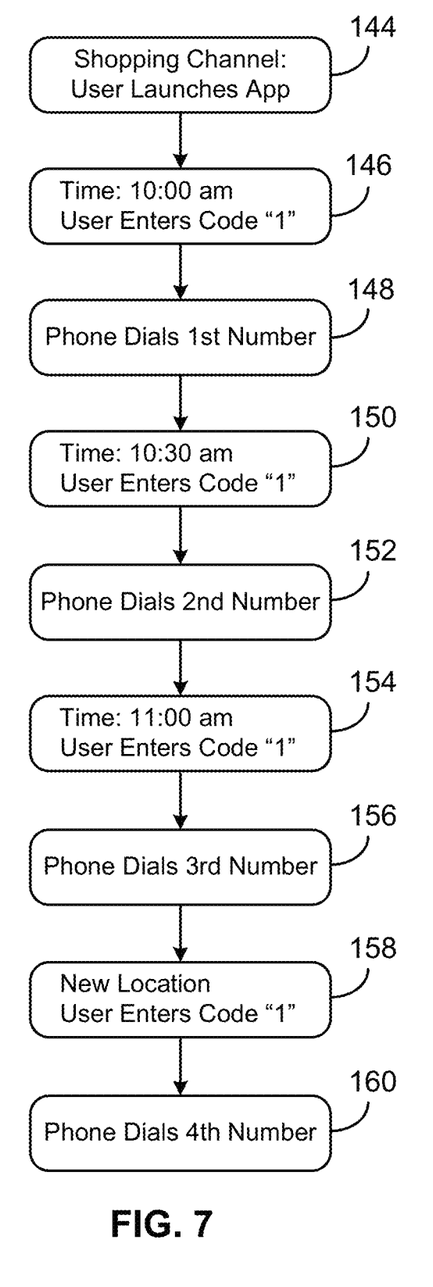
FIG. 7 is an exemplary flow diagram illustrating embodiment of making a phone call with a simple code in accordance with the present invention.

FIG. 7 depicts a schematic flow diagram of a dialing experience. Assume a user is at home watching a shopping channel on television on Saturday and begins purchasing process by launching an app on a smartphone at step 144.

Assume that the user is interested in a product presented on TV at 10:00 am. The TV screen shows a ten-digit contact phone number, a single-digit contact code "1", and a message "To place an order, please call us or press "1"." The task is to place an order and the code is a single-digit number "1". A user may dial the phone number to start it. But with the app, a user may only need to enter code "1" on the phone, as shown at step 146. After that, the app may transmit the code and time info to service center along with location info. The location info may be collected automatically or retrieved from a service provider. Next, the center may find a matching task. The task requests the center to send pre-arranged instructions to the phone. The instructions contain the phone number and a dialing request. After the app receives the instructions, it passes the message to a processing system. Next the phone starts dialing the phone number at step 148. Then the user may place a purchase order over the phone. Now the time is 10:30 am at step 150, and the user may become interested in another product shown on TV. The user notices that the code is still "1". Thus the user taps "1" and once again the phone is ready to start a dialing process. At step 152, the phone receives and calls a second phone number. It is seen that the code remains the same, but the task changes. This is because the time marker lets the code point to another action item based on the time data. Next the user may talk to a sales representative and complete a purchase transaction.

At 11:00 am, the shopping channel may present more products and the user may become interested in purchasing again. Assume the code for a new product is still "1". Thus the user keys in "1" one more time at step 154. Like previous cases, after service center receives the code plus time and location info, it obtains a corresponding action item. Then the center sends a message to the phone and causes the phone to dial a third phone number at step 156. Once the call goes through, the user may start another shopping round.

The next day, the user may go to a warehouse to pick up products ordered over the phone. The place may have a location marker. The user discovers that he or she may tap code "1" to talk to a customer representative. Then code "1" is entered at the phone at step 158, and subsequently the phone dials a fourth number automatically at step 160.

Above-mentioned examples indicate that a code under a time and location marker may be used multiple times and each time it may be arranged to invoke a different action.

Figure 8:
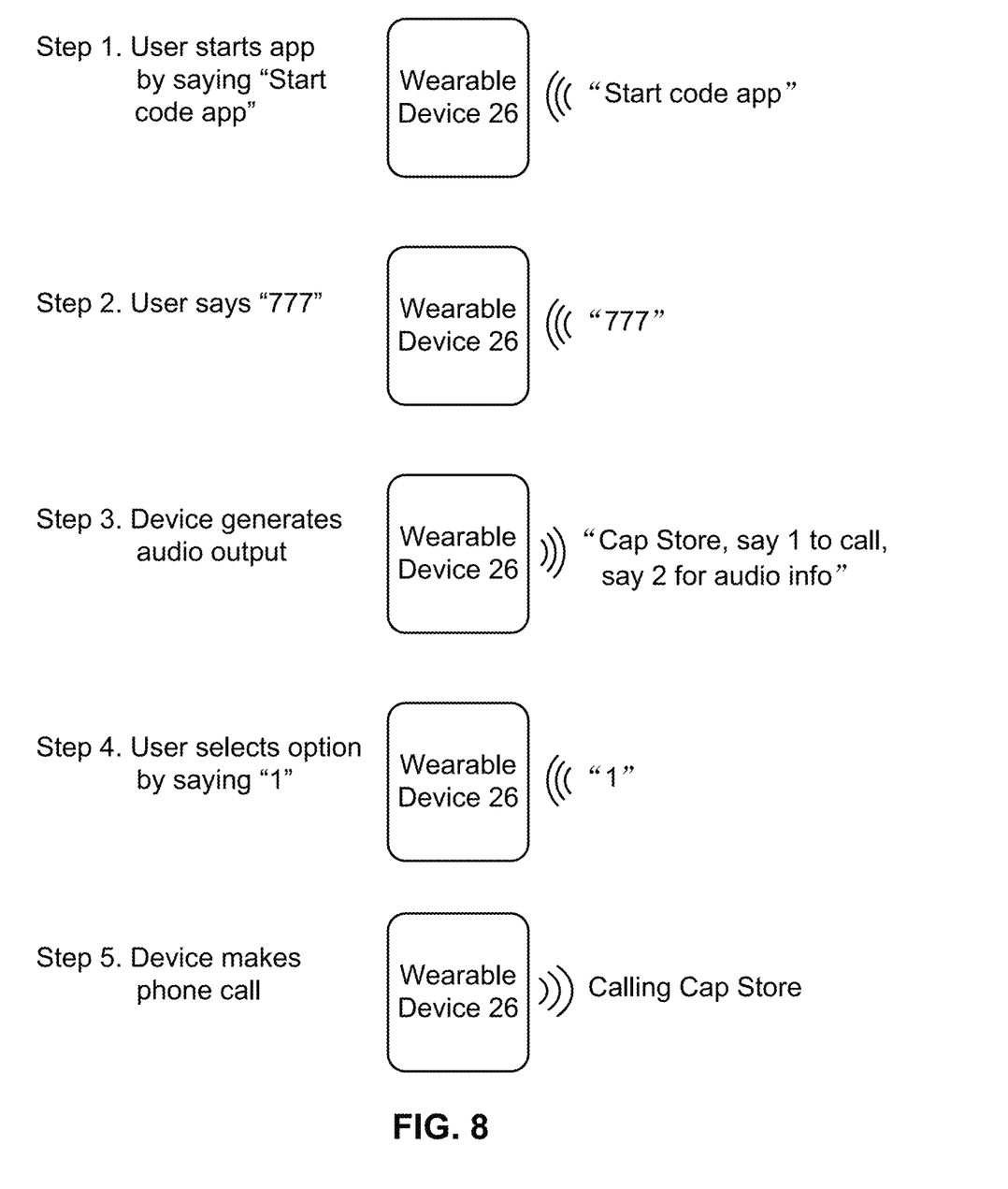
FIG. 8 shows exemplary diagrams illustrating embodiment of making a phone call using verbal input in accordance with the present invention.

As wearable devices, such as smart watch, smart band, smart ring, and other small or tiny gadgets, may have a small screen or no screen, input and output using a touch screen may become awkward or unavailable. In such scenarios, the verbal method may become an important input tool. A user may give verbal or audible instructions, and a device may generate audio output with or without presenting content items on a screen. Instructions may be of a simple code, a short name, or a short sentence, which may be easy and quick to say. FIG. 8 shows graphic diagrams of an embodiment using verbal inputs and audio output. Assume that a user is watching a commercial in which a shop named "Cap Store" promotes its newest products. The user sees a contact code "777" shown on a television screen. At step 1, the user says "Start code app" to a wearable device 26 to launch a code program, assuming the device has voice recognition capability. Alternatively, the program may also be opened by shaking device 26 a bit and then speaking to it, or tapping the device a couple of times and then speaking to it. The shaking or tapping act may be designed to alert device 26 and make it start a voice recognition process. Next at step 2, the user gives instructions by saying the code "777". Device 26 receives the voice message and converts it into a number by certain voice recognition algorithm. Then the code and marker info is transmitted to service center. The marker info includes location and time data which may be acquired already. Next service center finds a specific task in a look-up table stored in a database. The task is passed to device 26. Then at step 3, device 26 performs the task and produces an audio output, such as "Cap Store, say 1 to call, say 2 for audio info". The first sentence identifies the business name, Cap Store, to assure the user. The second sentence indicates saying "1" may make the device call the store. The last sentence indicates saying "2" may bring an audio presentation about the store, which may include introduction, promotions, and more options. At step 4, the user says "1". Then the device calls Cap Store at step 5.

Audio interaction between a user and a device has the merit of doing a task without using fingers, and thus without the hassle of key-in actions. Simple codes make the process easy and convenient, since the content of an input is simplified. A task may be arranged to have a voice version to suit the needs of audio processes. A voice version may also be designed to generate less or none visual presentation. For instance, a user may register two versions for a task. A normal version works for smartphone and tablet computer, while a voice version for smartphone, tablet computer, and devices with a much smaller size. When a device sends code and marker info to service center, a reference note may be included. The reference note is generated by the device automatically and may let service center know it prefers an audio process. For devices with very small screen or no screen, the reference note may always accompany the marker and code info. For other devices, two options may be presented to a user and the user may decide whether or not to send a reference note. After receiving a reference note, service center retrieves a voice version of a task from a database and sends it to a device.

If a name is assigned to a device, a user may use it in a verbal command or verbal input to implement a task conveniently. For instance, a voice input may contain a device name and a task. The name indicates which device shall take the order. If a device doesn't detect its name in a voice input, it means the command isn't for it and the device may discard the input. Word "task", as used herein, may include one or more words or items which describe what should be done. Examples of tasks in a verbal input include "Turn on air conditioning", "Start", "Go to channel 11", etc. As used herein, a device may include any electronic apparatus or gadgets which have a voice recognition mechanism, such as a smartphone, a smart watch, a smart speaker, and the like. Usually, the device is connected to the Internet. The device may also be connected to other devices and thus may communicate with them as well. The other devices, which may include a wide range of devices and appliances, may or may not have voice recognition mechanisms. Assume a smart speaker is named ABW. A user may utter "ABW, what's the weather forecast?" Then the speaker may start a search on the Internet, fetch weather info, and generate an audio response to report the weather situation. A user may also say "ABW, turn on the lights." Here, the lights are of other devices. The speaker may do the task or send instructions to a control system which would do it by following the instructions.

Alternatively, a name of a program may also be used for recognition when a device runs the program (e.g., a voice recognition application). In some embodiments, the name of a program may be utilized exclusively. Optionally, names of a device and a program may be utilized for recognition simultaneously. In the former scenario, a user may utter a task and the name of the program, instead of the name of the device, to submit a verbal command. The process of verbal command reception and task implementation may be similar to that described above (e.g., when a task and a device name are used). In the latter scenario, a user may either utter a task and the name of the device or utter a task and the name of the program to submit a verbal command. Further, names of multiple programs may be used for recognition when a device runs the programs. In such a case, a user may use any of the program names in a voice input to do a task.

When a task is represented by a simple code and a marker, a user may use the code to avoid saying a long sentence or memorizing an unfamiliar task description. Some tasks are easy to utter, like "Turn on the television". Some are not. For instance, instead of uttering "Go to website of XYZ Company and find PQ3 game console version 4.7b" or "Switch to the channel I watched last Tuesday and paid with XYZ credit card", a user may just say "Code 122" or "Code M1". For example, a user may say "ABW, do code 122" or "ABW, code M1." In both cases, the voice input contains a device name ABW, a keyword "code", and a code. The keyword indicates a task to carry out a code program and prompts the device to find a code in the input. After getting a code, the device sends it to service center and proceeds as aforementioned.

Hence when a device receives a voice input from a user, it may detect whether it contains its name first. If its name is detected, it ascertains whether the input includes a task. If a task is detected, the device starts executing the task. If a task is not found, it ascertains whether the input contains one or more keywords which indicate a code program and whether it contains a code. If one or more predefined keywords and a code are detected, the device starts a process to retrieve a task from service center using the code and marker info, assuming that the marker info is obtained automatically. Then the device implements the task after receiving instructions from the center. The instructions contain commands and certain content about the task. The task is retrieved using the code and marker info and thus is determined by the code, the marker info, and prearrangements at the center. Alternatively, after a device detects a voice input, it may ascertain whether the input contains its name and a task simultaneously and then search for one or more keywords and a code if a task is not obtained. In addition, the device may ascertain whether the input contains its name, a task, one or more key words, and a code at the same time after getting an input. If a task is found, the task is executed. If the device doesn't get a task but recognizes a code or one or more keywords and a code, it sends the code and marker info to service center and proceeds after getting instructions from the center.

As described above, a name of a program may be used for recognition when a device runs the program (e.g., a voice recognition application). In some embodiments, the name of a program may be utilized for recognition exclusively. Optionally, names of a device and a program may be utilized for recognition simultaneously. In the former scenario, a user may utter a code and the name of the program to submit a verbal command. The process of verbal command reception and task implementation may be similar to that described above (e.g., when a code and a device name are used). In the latter scenario, a user may either utter a code and the name of the device or utter a code and the name of the program to submit a verbal command. Further, names of multiple programs may be used for recognition when a device runs the programs. In such a case, a user may use any of the program names in a voice input to do a task.

Figure 9:
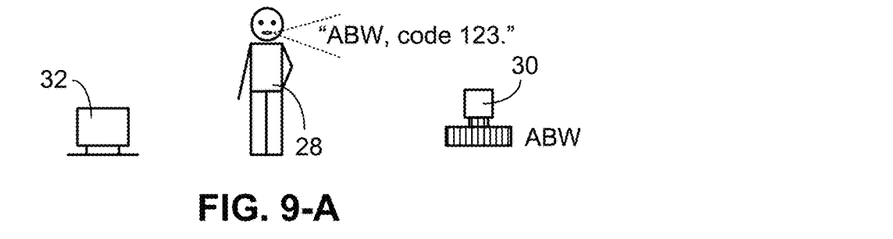

FIG. 9-A is a graphic diagram which shows an embodiment involving a voice input and a simple code. There are two devices 30 and 32. Device 30, with a name ABW, may be a smart speaker or another kind of smart device which takes verbal commands and implements tasks. The tasks may be predefined or may be performed according to proper instructions. Device 32 may be, for example, a television or a home appliance which is connected to and controlled by device 30. After a user 28 utters "ABW, code 123", device 30 detects the input and obtains its name through speech recognition. Then device 30 gets a keyword "code" and a number 123 from the input. The keyword means a code program and the number 123 matches a code of the code program or matches features of a code format. Next, device 30 transmits the code and location and time info to service center, where the location and time info represents a marker. The center retrieves a task using the code and marker from a database and communicates the task to device 30 in a message. Assume that the task is to turn on device 32. After receiving the message and getting the task, device 30 turns on device 32 or sends a signal to a control system which turns on device 32.

In applications involving verbal inputs, a code may be selected such that it is easy for a user to say besides being short and relatively easy to remember. Preferred codes may have formats such as a numerical number with one or a few digits, one or two words, a short string of letters, or a short string of numerical number and letter. Examples of codes may include "22", "Deals", "Best deal", "ky", "1a1b", "123123", etc. In general, it may be arranged that a code only contains less than five words or a short string of less than seven elements for voice command applications. The elements are of one-digit numerical numbers or letters. A device may have a look-up table listing the effective codes and update the table once receiving new information from service center. When part of a voice input matches a code on a look-up table, the device sends it plus marker info to service center. When part of a voice input matches a code format, such as a number, one or a few words, or a string of number and/or letter, the device sends it to service center along with marker info. When a voice input contains a task that is not doable, the task may be a multiple-word code. The device may send it to service center and wait for responses. For instance, a multiple-word code may be of "Call toys right now", "Call toys now", or "Call toys". The code may correspond to a task asking a device to call a phone number which is advertised on a toy channel on television.

In addition, a user may also just speak out a device name and a code without mentioning a keyword which indicates a code program. FIG. 9-B shows a graphic diagram which describes such a situation. The setting still comprises user 28 and devices 30 and 32. Assume that user 28 utters "ABW, 123." After device 30 gets the verbal input, it ascertains the content of the verbal input by looking for its name, a task, one or more keywords, and a code. Next, it recognizes the name and a number. The number is not a task. The device may check a look-up table to ascertain whether the number is a preset code. If it is a preset code, device 30 sends it to service center along with predefined marker info, e.g., the location and time info. If the number is not on the look-up table, device 30 may still send it to the center along with the marker info, since a number matches a code format. As described above, a code may also be a word, a string of letters, or a string of numbers and letters which matches a code format and is not part of a sentence. Hence, a voice input may only contain a device name and a code or the content of a code. After receiving a response from service center, device 30 proceeds with instructions to implement a task. The task may be performed at device 30 or at device 32. As described above, when a device may run a program (e.g., a voice recognition application), a name of the program may be used to replace the name of the device.

Figure 10:
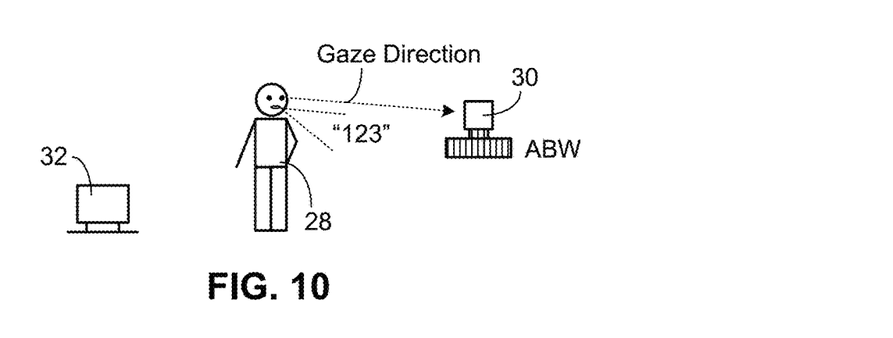

Besides a device name, a gaze act may also be used to indicate or specify a device. FIG. 10 illustrates an embodiment with a graphic diagram. The scenario again includes user 28 and devices 30 and 32. Device 30 has a gaze-sensing mechanism to ascertain whether a user gazes or looks at it. Assume that user 28 utters "123" and then gazes or looks at device 30. After analyzing the voice input, device 30 finds it doesn't contain its name, a task, and one or more keywords. Because it is detected that user 28 gazes or looks at a direction toward device 30, device 30 determines it should take the order. A gaze act plus a verbal input "123" has the same effect as the verbal input "ABW, 123". "123" may be replaced by a code of other formats. Then device 30 sends the code and marker info to service center and implements a task accordingly after receiving instructions from the center. The task may be performed at device 30 or device 32 depending on the instructions. In addition to a code, a voice input may also just contain a task. For instance, user 28 may say "Get weather forecast" and gaze or look at device 30. Device 30 recognizes the task but doesn't get its name. Assume a gaze-sensing system is in operation and it is detected that user 28 looks at a direction toward device 30. Then, device 30 starts to execute the task after the gaze direction (i.e., a gaze direction toward device 30) is determined. Thus, with a gazing act, a voice input may only contain a code (e.g., "Code 123"), a name of a task, the content of a code (e.g., "123"), or the content of a task.

Alternatively, more imaging sensors (not shown) may be arranged in FIG. 10 such that device 30 may detect where user 28 looks at or gazes at in areas around user 28. For example, device 30 may monitor user 28 continuously. If it is detected that user 28 looks at device 32 and utters a task without it saying a predetermined name (e.g., a device name), device 30 may take the order and execute the task via device 32. If it is detected that user 28 looks at device 32 and utters a code without it saying a predetermined name, a task name, and certain content of a task, device 30 may retrieve a corresponding task from, for example, a prearranged look-up table at its system, or send the code to service center and get a task from there if the look-up table does not contain the task. Device 30 executes the task at device 32 after the task is obtained.

Hence, a user may look at a device among multiple devices and utter a voice command. The voice command may only contain a code (e.g., "Code 123"), a name of a task, the content of a code (e.g., "123"), or certain content of a task. A control system (e.g., a smart speaker) may detect and interpret the voice command, detect the gaze or watching direction, and implement a corresponding task at the device that the user looks at.

When a gaze sensor is involved, the sensor may be powered on all the time or powered on only under certain conditions. For instance, a gaze sensor may be turned on after a voice input is received. Without a voice input, the gaze sensor remains in standby state, which may be desirable for users who have privacy concerns. When a gazing act is detected, the gazing act may happen before, during, and/or after a voice input is received. Options may be provided for a user to choose when a gaze sensor is on and when a gazing act is used as an indication factor.

Figure 11:
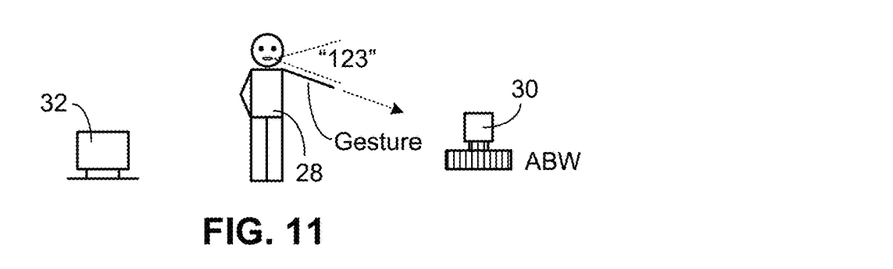
Figure 12:
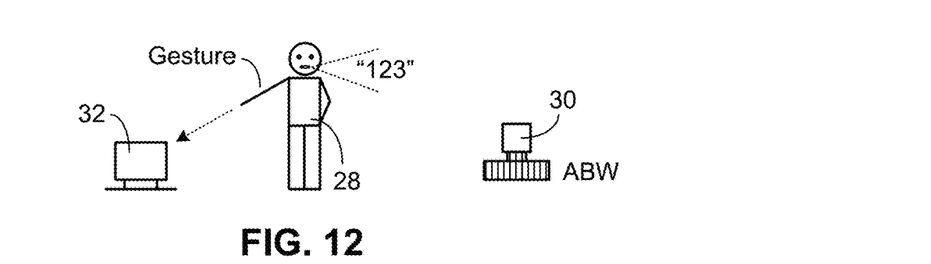

FIGS. 11 and 12 describe embodiments which involve verbal inputs and gestures. As discussed, a user may issue a command to a device by uttering its name and a code or uttering a code plus a gazing act. The gazing act may be replaced by gestures. In FIGS. 11 and 12, a hand gesture is used to point at a device. The setting once again includes user 28 and devices 30 and 32. User 28 utters "123" and points at device 30 or 32. Device 30 may comprises a gesture sensor to detect gestures, such as hand and finger gestures performed by the user. The gesture sensor may employ a specific camera or video camera plus certain algorithm to ascertain gestures. A gaze detector may also be used for gesture sensing. As the voice input only has the three-digit number, device 30 doesn't find its name ABW or a name of a predetermined program. Device 30 further ascertains whether the user gazes and/or gestures at it. As shown in FIG. 11, it is detected that the user points at device 30, indicating that device 30 may take the job, get a task from service center, and execute the task. Since number 123 fits a code format, device 30 sends it to service center along with the marker info. The center obtains a matching task and transmits it to device 30. Then device 30 implements the task at device 30, device 32, or another device according to instructions of the task.

When it is detected that the user points at device 32 using a hand, as shown in FIG. 12, a corresponding task should involve device 32. Again, as number 123 fits a code format, device 30 sends it to service center plus the marker info. The center obtains a matching task through the code and marker info and transmits the task information to device 30. Then device 30 sends a signal to device 32 and causes implementation of the task at device 32. Similarly, user 28 may utter "Turn off" and gesture at device 32, which contain the content of a task and a target device for the task. Device 30 may detect the voice command and gesture. Next, device 30 may take the order and do a task via device 32, i.e., shutting down device 32. Thus, with a gazing or gesturing act, a task may be performed using a voice input that only contains a code (e.g., "Code 123"), a name of a task, the content of a code (e.g., "123"), or certain content of a task.

Like gaze detection, when gestures are sensed before, during, and/or after a time period in which a voice input is received, the gestures may qualify as a user command or part of a user command. Options may be provided so that a user may select conditions for gazing and gesturing. For instance, a user may opt for gazing or gesturing detection only after a verbal input is uttered. Then, only gazing or gesturing actions which happen after a user's utterance are counted as a command. Consequently, a corresponding device may be configured such that a gaze and/or gesture sensing process is arranged to start only after a verbal input is detected.

In summary, voice commands may have three modes: (1) A voice input; (2) A voice input plus a gazing act; (3) A voice input plus gestures. The first mode corresponds to voice inputs which include a predetermined name (e.g., a device name or a program name) plus a task, a predetermined name plus a keyword and a code, or a predetermined name plus a code. The second and third modes correspond to voice inputs which don't contain a predetermined name but include a task, a keyword and a code, or a code. When a predetermined name is not included in a voice input, a user may use a gaze act and/or gestures to indicate or specify a device. The keyword is used to state a code program and thus a code in a voice input. One or more keywords may be used to indicate a code program. For instance, the one or more keywords may include "code", "code program", "code name", etc. A code may also be recognized by its format, such as aforementioned numbers, words, or strings of numbers and/or letters without the keyword. When a user gazes and points at a device at the same time, it has the same effect as the user gazes or points at the device separately.

Optionally, multiple options may be provided so that a user has the freedom to issue a voice command based his or her preference on a mode. Consequently, a device may be configured to accept different modes of voice commands using multiple detection methods. The methods include voice recognition, gaze sensing, and gesture sensing. For instance, after a voice input is received, a device ascertains whether the input contains a predetermined name. If the predetermined name is detected, it ascertains whether the input contains a task, a keyword, and/or a code. Alternatively, the predetermined name, task, keyword, and code may be ascertained simultaneously. In addition, if a predetermined name is not detected but a task or a code (or a code format) is recognized, a gaze direction or a gesture of a user may be ascertained to determine a target device. Then the target device may be arranged to perform the task or may send the code to service center and proceed according to instructions received from the center. Further, when the target device has information about a code and a corresponding task, after detecting the code, the target device may perform the task directly without communicating the code to and receive instructions from service center.

The methods to do a task as illustrated above employ simple and easy schemes. The codes are convenient to use. The verbal commands, gaze act, and gestures are intuitive and straightforward. The methods may be especially useful for a user in an autonomous vehicle (also known as a driverless or self-driving vehicle), a self-service store (e.g., a store without cashiers), or a smart home, where the user-machine interaction plays an active role.

CONCLUSION, RAMIFICATIONS, AND SCOPE

Thus it can be seen that systems and methods are introduced to execute a task using a simple code.

The improved method and system have the following features and advantages:
(1). A simple code may be combined with a unique marker to represent a task;
(2). Distinctive marker information includes location, time, object, entity, image, or any combination thereof;
(3). A user may implement a task by submitting a simple code;
(4). A user may implement a task by uttering a verbal command which includes a predetermined name and a simple code; and
(5). A user may implement a task by uttering a simple code plus a gazing act or a gesture.

Although the description above contains many specificities, these should not be construed as limiting the scope of the invention but as merely providing illustrations of some of the presently preferred embodiments. Numerous modifications will be obvious to those skilled in the art.
Ramifications:

A simple code may be used to do many tasks. For instance, when a user wants to look at a user's manual of an appliance, the user may use a simple code to get connected to a website containing the info. For home appliances such as a refrigerator, an air conditioner, an alarm system, a code may be printed on a label, which may be seldom noticed and rarely picked up. A code for such cases may contain a unique sign to distinguish it from other code. The sign may be arranged to show up on a code app interface only when a home marker is in effect. The sign may mean the code is for appliance use.

At a bus stop, a simple code may be used to get bus schedules. Optionally at a bus stop, a simple code may be used to obtain the estimated arrival time of the next bus.

A sign may be used as a marker, a code, part of a code, or a combination of a code and a marker. For instance, certain signs may be arranged beside a virtual or soft keyboard in a code input window so that a user may tap a sign conveniently when keying in a number and/or a letter. Examples of signs may include "home" icon for home, fork and knife representing restaurant, car sign for taxi service, bus icon for bus stop, or a logo of a business. Here a sign may be considered as either marker or part of a code and it doesn't make a difference in terms of the effect, as the goal is to make a distinctive label to tag a task. When a sign is used for code, it may be of part of a code, since the other part may be a number. For instance, when a user is looking for a place around lunch time, he or she sees a simple code posted on the door of a restaurant. The user may start an app on a smartphone, tap a restaurant sign and then enter the code. Next the code, time, and the sign are sent to service center. A corresponding action item may be found and then a message may be sent to the phone. The message may contain information about the restaurant or cause the phone to log on a website of the restaurant. A sign may help pinpoint a task and may be useful when location marker is unavailable or not distinctive enough due to the issue of positioning resolution. As there may be lots of signs for various businesses or entities, it may become obtrusive if many signs appear on a display screen at the same time. So it may be arranged that a sign only shows up on screen when it is likely to be used. Appearance of signs may be controlled by a code app or service center based on marker info and potential tasks a user may be interested in, since marker info and potential tasks are connected by signs. For instance, when it is detected that a user is on a street in a downtown area, it may indicate that the user may need taxi service. Such a need may be obtained by analysis using certain algorithm. In some embodiments, calculations may be made to find out tasks which are frequently requested by users in an area. For example, tasks that were performed more times than other tasks in an area in a given time period may be selected to form a group. Signs of the select tasks may appear in a code app interface for users in the area. For example, if a select task is about hailing a vehicle, a taxi sign may show up in the code app interface. A user may tap the sign and then key in a simple code to contact a preferred taxi company. As used herein, a sign may be a logo, an icon, a letter, a word, an image, or a picture. As aforementioned, an easy-to-use code may be a one-digit, two-digit, or three-digit number. Since a sign is easy to recognize, handle, and remember, it may be arranged that a code contains a sign plus a one-digit, two-digit, or three-digit number only. For instance, when entering a code on a touch screen, a user may tap a sign first, followed by tapping at most three digits to complete a code input process.

When a user executes a task at a device, it may be considered that the user requests a task. Optionally, tasks requested by a user may be collected and summarized by certain algorithm. Signs of the most requested tasks (e.g., the top five tasks) may show up in a code app interface. The user may tap a sign to request a task, or tap a sign plus a simple code to request a task, which provides convenience for the user to do favorite tasks.

As described above, a simple code may be used to carry out a task at another device. For instance, a product at a store may have two codes, one for fetching product-related info, which is described already, and the other for placing the product in a virtual shopping cart for purchase purpose. In the latter case, service center may follow instructions of a task and send a message to a store system notifying it of the purchase request. The store system may be located at another remote place. It may take it over and add the product to a shopping cart for the user. The user then may arrange a payment method and have the store ship the product to an address. The interaction between a store system and a user device may be carried out directly, or arranged via service center. In the former case, the store system and user device are connected and may talk to each other directly. In the latter case, they are not connected directly. Info transmitted has to go through service center, which passes it to a receiving party.

Similar to examples of getting online info, a simple code may be presented or advertised to make users visit a website, such as a news portal, a search engine site, a gaming site, or a file downloading site.

A simple code may also find use in surveys. For instance, a survey question "Do you like the show?" may be presented along with two codes on screen. One code is for "Yes" and the other for "No". So a user may just enter a code to express opinion and doesn't need to go to a specific website to cast vote. Here location and time data may be of marker info. Codes may also be used in a contest. For instance, a television screen may show that tapping "1" means voting for contestant 1, and tapping "2" means voting for contestant 2. After a user starts a code app, home marker info is obtained. Then a "V" icon may appear in the code app interface, which may be related to a message from service center. The message may be prearranged because of the contest event. Without the message, the "V" icon may not show up. The "V" icon may be part of marker or part of a code. To vote, a user may tap "V' and then tap 1 or 2 on a virtual keyboard. Then marker and code info is sent to service center. The center finds a matching task which requests the center to forward the info to a processing facility of the event.

RFID may also be used as a store marker when positioning methods are not accurate enough or not available. For instance, a user may swipe a smartphone in front of a RFID tag at a store counter to hook up with it to get marker info from the RFID data. Then the user may tap simple codes displayed at the store to access information or perform online transactions such as reserving a product, booking services, checking promotions, and so on. The marker info may remain valid within certain period of time unless being cancelled or another marker becomes active.

In addition to a gaze sensor and gesture sensor, a device may also have a locating sensor to identify a user and detect the position of the user who has just uttered some verbal content. A locating sensor may measure and analyze sound waves to determine a source position using mature technologies. The locating sensor may also be used to collect voice inputs from a target user only, where the target user may have gazed at a device or may be gazing at the device. Locating a target user becomes critical when multiple users are on site. For instance, a device may be configured to receive and interpret a voice input, identify and locate a user who just gave the voice input using a locating sensor if the input doesn't contain a device name, measure the user's gazing direction, ascertain whether the user gazes at the device simultaneously or within a given time period after the voice input is received. If a qualified gaze act is detected, the device implements a corresponding task. The task may come from the voice input directly or be retrieved from service center using a code from the voice input.

Instead of detecting a gaze direction, the direction at which a user faces may be ascertained. In some applications, it may be difficult to sense a user's eye movement, due to technical issues or ambient lighting conditions. Thus it may be arranged to detect whether a user faces a device. For instance, a device may use an imaging sensor like a camera to take pictures or videos of a user. Certain algorithm may be used to identify facial features of the user, determine positions of the user's eyes, and then calculate a distance between a spot of the device and one eye and another distance between the spot and the other eye. The spot may be a point at the center of the device or the center of an output component. If difference of the two distances is smaller than a given value, it may be considered that the device is right in front of the user or the user faces the device. Consequently, it may be configured that in all of the above embodiments or examples, the gazing requirement may be replaced by the facing requirement when a user or entity allows doing so. For instance, a requirement of gazing at a device may become a requirement of facing a device.

Referring to FIGS. 11 and 12, both gaze sensing and gesture sensing techniques may be used to interpret a user's command. After user 28 utters "123", device 30 receives the voice input and analyzes it to determine whether the input contains the name ABW, a task, and a code. Device 30 recognizes a number "123" but doesn't find its name and a task in the voice input. The number fits a code format and may be a code. Thus the gaze direction and gestures of user 28 are ascertained by device 30. If it is detected that user 28 gazes at device 30 and gestures at device 32 (e.g., pointing at device 32 by hand or finger), it indicates device 30 should take the order and execute a task via device 32. If the voice input contains a task, device 30 implements the task at device 32. If the input contains a code or certain content that matches a code format, device 30 sends the code or the content to service center to get a task. Then it executes the task at device 32.

A device may keep codes that a user used within a given time period in a file or use the codes to construct a look-up table for the user. The codes may be considered as the user's "personal codes". When the device receives a verbal input, it may compare the content of the input against the "personal codes". As a user may use some codes repeatedly, it helps a device recognize them quickly and accurately.

Lastly, besides tapping or clicking buttons to key in a code of number, letter, or sign on a device, a user may also scribble number, letter, or sign on a touch screen to do the same job. When a sign is involved, it is assumed that the sign is designed suitable for scribbling.

Therefore the scope of the invention should be determined by the appended claims and their legal equivalents, rather than by the examples given.

The invention claimed is:

1. A method performed for executing or implementing a task, comprising:
   1) detecting a voice input from a user using voice recognition;
   2) ascertaining whether the voice input includes a predetermined name, the task, and a code via the voice recognition and whether the user looks at a direction toward an electronic device via a gaze-sensing technique;

3) causing implementation of the task if the voice input comprises the predetermined name and the task;
4) transmitting the code to a service facility if the user looks at a direction toward the electronic device and the voice input comprises the code and doesn't include the predetermined name and the task; and
5) receiving instructions from the service facility after the transmitting step and causing implementation of the task, wherein the instructions comprise information about the task.

2. The method according to claim 1, further including causing implementation of the task if the user looks at a direction toward the electronic device, the voice input comprises the code and doesn't include the predetermined name and the task, and information about the code and task is known.

3. The method according to claim 1, further including causing implementation of the task if the user looks at a direction toward the electronic device and the voice input comprises the task.

4. The method according to claim 1, further including transmitting marker info to the service facility, the code plus the marker info representing the task.

5. The method according to claim 1, further including ascertaining whether the voice input includes one or more keywords, the one or more keywords indicating a code program.

6. The method according to claim 1, further including implementing the task via the electronic device or via another device.

7. The method according to claim 1 wherein the code only contains less than five words or a string of less than seven elements, the less than seven elements are at least one of one or more one-digit numerical numbers and one or more letters.

8. A method performed for executing or implementing a task, comprising:
1) detecting a voice input from a user using voice recognition;
2) ascertaining whether the voice input includes a predetermined name, the task, and a code via the voice recognition and whether the user looks at a direction toward an electronic device via a gaze-sensing technique;
3) causing implementation of the task if the user looks at a direction toward the electronic device, the voice input comprises the code and doesn't include the predetermined name and the task, and information about the code and task is known;
4) transmitting the code to a service facility if the user looks at a direction toward the electronic device, the voice input comprises the code and doesn't include the predetermined name and the task, and information about the task is not known; and
5) receiving instructions from the service facility after the transmitting step and causing implementation of the task, wherein the instructions comprise information about the task.

9. The method according to claim 8, further including causing implementation of the task if the voice input comprises the predetermined name and the task.

10. The method according to claim 8, further including causing implementation of the task if the user looks at a direction toward the electronic device and the voice input comprises the task.

11. The method according to claim 8, further including transmitting marker info to the service facility, the marker info and the code representing the task.

12. The method according to claim 8, further including ascertaining whether the voice input includes one or more keywords, the one or more keywords indicating a code program.

13. The method according to claim 8, further including implementing the task via the electronic device or via another device.

14. The method according to claim 8 wherein the code only contains less than five words or a string of less than seven elements, the less than seven elements are at least one of one or more one-digit numerical numbers and one or more letters.

15. A method performed for executing or implementing a task, comprising:
1) detecting a voice input from a user using voice recognition;
2) ascertaining whether the voice input includes a predetermined name, the task, and a code via the voice recognition and whether the user looks at a direction toward an electronic device via a gaze-sensing technique;
3) causing implementation of the task if the user looks at a direction toward the electronic device and the voice input comprises the task;
4) causing implementation of the task if the user looks at a direction toward the electronic device, the voice input comprises the code and doesn't include the predetermined name and the task, and information about the code and task is known;
5) transmitting the code to a service facility if the user looks at a direction toward the electronic device, the voice input comprises the code and doesn't include the predetermined name and the task, and information about the task is not known; and
6) receiving instructions from the service facility after the transmitting step and causing implementation of the task, wherein the instructions comprise information about the task.

16. The method according to claim 15, further including causing implementation of the task if the voice input comprises the predetermined name and the task.

17. The method according to claim 15, further including transmitting marker info to the service facility, the marker info and the code representing the task.

18. The method according to claim 15, further including ascertaining whether the voice input includes one or more keywords, the one or more keywords indicating a code program.

19. The method according to claim 15, further including implementing the task via the electronic device or via another device.

20. The method according to claim 15 wherein the code only contains less than five words or a string of less than seven elements, the less than seven elements are at least one of one or more one-digit numerical numbers and one or more letters.

* * * * *